April 5, 1966     S. N. TOWER     3,244,597
FAST BREEDER NEUTRONIC REACTOR
Original Filed Oct. 9, 1959     4 Sheets-Sheet 1

INVENTOR
Stephen N. Tower
BY
Donald Smith
ATTORNEY

April 5, 1966   S. N. TOWER   3,244,597
FAST BREEDER NEUTRONIC REACTOR
Original Filed Oct. 9, 1959   4 Sheets-Sheet 2

Fig. 5.

April 5, 1966  S. N. TOWER  3,244,597
FAST BREEDER NEUTRONIC REACTOR
Original Filed Oct. 9, 1959  4 Sheets-Sheet 3

Fig.6.

United States Patent Office 3,244,597
Patented Apr. 5, 1966

3,244,597
FAST BREEDER NEUTRONIC REACTOR
Stephen N. Tower, Franklin Township, Westmoreland County, Pa., assignor to Westinghouse Electric Corporation, Pittsburgh, Pa., a corporation of Pennsylvania
Continuation of application Ser. No. 845,544, Oct. 9, 1959. This application Dec. 14, 1962, Ser. No. 246,650
19 Claims. (Cl. 176—18)

This application is a continuation of applicant's copending application Serial No. 845,544 entitled "Fast Breeder Neutronic Reactor," filed October 9, 1959 assigned to the assignee of the present application and now abandoned.

The present invention relates to a neutronic reactor of the fast breeder variety and more particularly to a reactor of the character described employing fuel in a form of discrete freely movable pellets.

In contrast to a thermal neutronic reactor, a fast reactor involves a chain reaction propagated in one or more of the fissionable isotopes $U^{235}$, $U^{233}$, $Pu^{239}$, by means of fast neutrons, that is to say, that portion of the neutron spectrum having velocities in excess of 10,000 meters per second, rather than by thermal neutrons or neutrons having kinetic energies equivalent to that of their environment or of thermally excited hydrogen ions. Consequently a fast reactor does not require a moderator material to slow the normally fast neutrons emitted in the fissioning process to thermal velocities, and thus the deleterious effect upon neutron economy caused by parasitic absorption of the moderator is eliminated. Also obviated are measures frequently provided in thermal reactors for the conservation of thermal neutrons, as the latter are readily absorbed in structural and other materials employed in the reactor. Such conservational measures include the provision of a graphite or water reflector and the necessary use of structural, coolant, fuel and moderator materials having exceptionally low neutronic capture cross-sections. In addition, the thermal reactor requires a large number of control rods to override properly and safely the excess reactivity normally built into a thermal core largely to compensate for build-up of fissional products and thus to afford a practical life-cycle for the core.

In the case of heterogeneous thermal reactors the build-up of fissional products eventually poisons the reactor core and the same have to be removed periodically by replacement with a new core. In a homogenous reactor the fuel may be purified by a bleed-and-feed system, but nevertheless (complicated and expensive) chemical reprocessing of the fuel is necessary either continuously or at frequent intervals.

In a fast reactor, however, the fast neutrons are not absorbed by the fissional products, and therefore these products need only be removed at infrequent intervals as determined by fuel integrity or reactivity loss caused by burn-up of fissionable atoms in the core. Because the fast neutrons are not absorbed by the fissional products, the excess reactivity of the core need only be minimal for an adequate core cycle; therefore, only a small number of control rods are required for effective and safe control of the reactor. For the same reason the frequently high purity requirements of structural and fuel materials in the case of thermal reactors are eliminated in fast reactors, because the fast neutrons are not readily absorbed in the impurities which may be found in these materials. Similarly the structural, fuel-cladding, and coolant materials need not be selected from materials having exceptionally low neutronic capture cross sections.

Thermal reactors of the heterogeneous variety suffer from a further disadvantage in that heavy and expensive shipping coffins must be provided for transporting the individual fuel elements of the reactor and additional shielding means are required for removing the entire core assembly from the reactor for replacement or maintenance purposes as the case may be. Furthermore, these procedures require the use of complicated remote handling equipment and "hot" laboratories for handling and reprocessing the fuel. On the other hand in the homogeneous type of thermal reactor the solution or slurry of the reactor fuel is circulated throughout the primary system of the reactor with the result that not only the reactor vessel itself but the entire primary circuits, including the steam generators, must be biologically shielded. This arrangement requires remote maintenance procedures, since the radioactivity of the circulating fuel will not decrease substantially within a practical waiting period after shutting down the reactor. These disadvantages are eliminated in the present invention through the use of a reactor core comprising fuel in a form of discrete pellets sometimes referred to as a pebble-bed reactor. Unclad pellets, of course, can be employed if it is feasible to shield the reactor system as noted above. The pebble-bed core, however, is modified in a novel manner to adapt the invention for use with a fast reactor, particularly one in the breeder category.

Fast reactors are inherently controllable as a result of the small negative temperature coefficient of reactivity. Previous reactors of this category, however, have been unable to take full advantage of this negative temperature coefficient, because such reactors employed rod or plate type fuel elements in a heterogeneous array. At operating temperatures these rods and plates have a tendency to bow inwardly toward the central axis of the core; and this inward bowing, of course, results in an overriding positive coefficient, which in one case actually resulted in melting down the core. As demonstrated later in this description, this disturbance cannot occur in the pellet bed of the invention, for the coolant spaces or porosity of the core will remain essentially constant regardless of temperature changes in the core.

Inasmuch as a fast reactor is insensitive to fissional product poisoning, as pointed out previously, the reactor of the invention when constructed as a breeder type reactor can burn a portion of its own bred fuel without reprocessing the blanket material and with a minimum of handling the same.

Another disadvantage of previous designs of fast reactors and even most thermal reactors is that such reactors are not "fail-safe" in the event of and as a direct result of loss of coolant flow caused by power failure or some other contingency. In such reactors, the loss of coolant flow will not directly shut down the reactor; and instrumentation must be relied upon to actuate scram circuitry in order to terminate the chain reaction.

As pointed out previously, thermal neutronic reactors frequently require a large number of control rods for the purpose of controlling the chain reaction. For each of these control rods a complicated and expensive driving mechanism is employed, which must be further arranged to permit the control rod to descend into the core in the event of power failure or other contingency necessitating shutting down the reactor. In the interest of safety it is imperative that all of these control rods be so arranged for quick insertion into the core, when the reactor is scrammed or suddenly shut down. Such a reactor is said to be fail-safe. Furthermore, in view of the large number of control rods and individual driving mechanisms therefor, the possibilities of malfunctioning are eminent. In the arrangement contemplateed by the invention however, only a relatively few control rods are required to perform the functions of control and shut-down; however, their insertion into the core is not essential to scram the reactor of the invention on an emergency basis.

In view of the foregoing, it is an object of the present invention to provide a novel and efficient form of fast reactor. More specifically, it is an object of the invention to provide a reactor system of the fast breeder category.

Another object of the invention is the provision of a fast reactor employing a novel arrangement of a pebble-bed type core.

Still another object of the invention is the provision of a fast breeder reactor employing a pebble-bed core in a novel manner and either a packed or fluidized pebble-blanket arrangement.

A further object of the invention is the provision of a fast reactor having means associated therewith to cause a reactor to "fail-safe" in the event of and as a direct result of loss of coolant flow.

Another object of the invention is the provision of a fast reactor in which the control rods are employed primarily for shim control and are not the only means of shutting down the reactor.

A still further object of the invention is the provision of a fast breeder reactor having novel means associated therewith to enable the reactor to burn its own bred fuel without the necessity of intermediately processing the fuel.

Yet another object of the invention is the provision of a fast reactor having an overall negative temperature coefficient of reactivity and arranged to permit a measure of control thereof by means of the negative coefficient.

Other objects of the invention are to furnish novel means for providing a measure of control of a fast reactor by varying coolant flow and for arranging the fertile material thereof to provide effective shielding or to equalize exposure thereof for conversion purposes.

These and other objects, features and advantages of the invention will be elaborated upon during the forthcoming description of illustrative forms of the invention, with the description being taken in conjunction with the accompanying drawings wherein:

In accordance with the invention there are provided in a fast reactor system means for transporting and forming the nuclear fuel material into a critical assembly for the proper operation of the reactor. However, upon termination or loss of coolant flow, means then become effective for transporting and forming the fuel into a different configuration so that the fuel is positively prevented from becoming critical while in the latter state. In one arrangement of the invention the reactor core is surrounded with a fertile or blanket material in the form of discrete pellets. It is within the contemplation of the invention that the pellets of the fertile material can be packed solidly about the core to afford maximum conversion and shielding within the reactor vessel or that the pellets can be fluidized within the blanket area of the vessels so that the slight random movements of the individual pellets will provide mixing and substantially even exposure of each pellet to fast neutrons. In the latter case, then the blanket material will be more or less uniformly transmuted into the corresponding fissionable isotope. A fine degree of control is imparted to the reactor by a relatively small number of control rods, which operate as shim rods to provide accurate and adjustable control of the critcal mass. As pointed out more fully hereinafter, it is considered that major changes in reactivity of the core can be effective, if desired, by varying the coolant flow rate through the reactor core. Also, according to the invention at least some of the conduits entering the reactor vessel and coupled to the inner chamber or core thereof are disposed in a manner so as to prevent a direct path for radiation streaming from the core to a point outside the reactor vessel.

Referring now more particularly to FIGS. 1 to 4 of the drawings, there is illustrated therein a fast breeder reactor 10 comprising a vessel 12 having a central core structure or container 14 and a generally cylindrical blanket or fertile chamber 16 enclosed therebetween. The vessel 12 further includes an up-standing cylindrical portion 18, a bottom opening of which is closed by a spheroidal bottom wall 20. The cylindrical portion 18 of the vessel is joined to a coolant plenum member 22 through a frustoconical section 24.

It is intended, of course, that the reactor be cooled by a liquid metal such as sodium or sodium potassium alloy. Other liquid metals can be used and this term includes those metals which are liquid above 500° F. and are compatible with conventional structural metals. In this arrangement the reactor vessel 12 is fabricated from type 316 stainless steel which has been used successfully in sodium systems at temperatures up to 1620° F. If however, the reactor is not to be operated above 1000° F., type 304 stainless steel can be used more economically. As a result of using a liquid metal for the reactor coolant the primary reactor system is pressurized at a relatively low maximum pressure of 160 lbs. per square inch gage with the suction pressure of a pump 228, described below, being about 30 p.s.i.g. Under such conditions the reactor vessel 12 need only be about 1" in wall thickness. The system piping presently to be described can be a standard schedule or even lightweight due to the low system pressures.

The outside diameter of the vessel 12 is about seven feet and the effective height of the fertile section 16 is about eight feet, while the overall vessel height including the top plenum member 22 is about twelve feet. On the other hand, the outside diameter of the core structure 14 is 30 inches, while the active height thereof is 27 inches. Inasmuch as the pressure is equalized across the core structure 14, as will be evident from the following discussion, the wall portions of the core structure 14 within the vessel 12 need not be as thick as that of the reactor vessel 12; instead the aforesaid wall portion of the core structure 14 need only be furnished with sufficient thickness to support the core structure and in this example is approximately ½ inch.

The frustoconical section 24 and the spheroidal bottom portion 20 are joined respectively to the cylindrical portion 18 of the vessel 12 by means of annular structural and sealing welds 26 and 28. The plenum member 22 is removably joined to the reduced portion of the frustoconical section 24 by means of mounting flanges 30 and 32 joined respectively to these components. The mounting flanges 30 and 32 are joined for example by a plurality of mounting bolts denoted generally by reference numerals 34. A junction 36 between the plenum member 22 and the frustoconical section 24 desirably is hermetically sealed by a non-structural sealing weld 38, such as that disclosed and claimed in Patent No. 2,805,-

789, issued to Kreh et al. on September 10, 1957 and assigned to the assignee of the present application.

Adjacent the inner wall surfaces of the vessel 12 a complementarily formed thermal shield and blanket pellet container 40 is positioned. The thermal shield 40 includes a frustoconical section 42 joined to a cylindrical section 44, for example, by the annular structural and sealing weld 46; and the components of the thermal shield 40 are spaced inwardly from similar components of the vessel 12 to form an annular flow passage 48 therebetween. Access of coolant fluid to the passage 48 is provided by a plurality of perforations 50 disposed adjacent the bottom of the shield 40 and by similar perforations 52 positioned near the top or outlet of the shield 40. The passage 48 thus provides freedom of movement to the coolant fluid adjacent the inner walls of the vessel 12 so that thermal stresses are minimized therein. The thermal shield 40 can be eliminated depending upon the thickness and concentration of the fertile material comprising the blanket area 16.

As indicated heretofore the core structure 14 is supported centrally of the reactor vessel 12. This arrangement leaves a substantial volume comprising the fertile area 16, which volume substantially surrounds the active portion of core structure 14. The fertile volume 16 is substantially filled with either clad or unclad pellets or spheres 54 of fertile material such as uranium carbide (UC), uranium dioxide ($UO_2$), or other uranium metal alloys. In this example the uranium is source grade uranium or depleted uranium consisting substantially of the fertile isotope $U^{238}$. The latter isotope can be converted to a fissionable transuranic isotope $Pu^{239}$ by capture of a neutron and subsequent beta decay. The physical structure of the pellets 54 will be discussed in detail further in this description.

The pellets 54 maintained within the blanket area 16 are prevented from upward movement into the plenum member 22 by a blanket screen grid 56. The grid 56 is of annular configuration and rests upon a top edge 58 of the thermal shield 40. The blanket grid 56 is further provided with a plurality of flow openings or perforations 59, which are too small to admit any of the pellets 54 but permit the coolant circulated through the blanket area 16 to enter the plenum member 22 in a manner more fully described hereinafter.

In furtherance of this purpose the outer periphery of the blanket grid 56 forms a sliding fit with the adjacent portion of the frustoconical section 24. An inner peripheral edge 60 of the blanket grid 56 is shaped to receive outlet flow nozzle 62 of the core structure 14. As set forth later in this description the engagement between the outlet nozzle 62 and the blanket grid 56 can be employed to hold down the grid 56 against upward flow of coolant through the blanket area 16. Alternatively however, a downwardly extending tubular projection 64, secured to the upper plenum member 22 adjacent the junction 36 between the plenum member and the remainder of the reactor vessel 12, is disposed to engage the upper peripheral surface of the blanket grid 56 and thus to secure the grid into position when the plenum member 22 is secured to frustoconical vessel section 24. The thermal shield 40, of course, supports the weight of the grid 56 and at least part of the core structure 14 by the bearing contact of its bottom edge 66 with the peripheral surface area of the bottom wall portion 20.

Coolant fluid is supplied to the blanket section 16 by means of a central inlet conduit 68, which is joined to the bottom wall portion 20 by means of tubular extension 70 and an annular sealing structural weld 72. The pellets 54, however, are prevented from dropping into the conduit 68 by means of a perforated covering plate 74, the perforations 76 of which are too small to admit the pellets 54. In this example of the invention, the conduit 68 is assembled from 6 inch schedule 40 piping, which can be fabricated from type 304 stainless steel.

It is contemplated from the invention that suitable means be provided for initially filling or otherwise adding pellets to the blanket area 16 and for withdrawing pellets therefrom either for use, after transmutation of at least a portion of the fertile material thereof, directly within the core structure 14 or for other purposes. Such means in this example are hydraulically controlled by remotely operated valves and thus do not require handling by or exposure of operating personnel to the highly radioactive pellets.

One form of such means includes pellet inlet and outlet conduits 78 and 80, respectively. These conduits are, in this example, fabricated from standard 2 inch stainless steel piping. The inward end of the inlet conduit 78 is inserted through a projecting sleeve member 82 of the frustoconical vessel section 24 and through an opening 84 of the appropriate size formed in the thermal shield 40 and aligned with the inner opening of the sleeve 82. When so inserted the conduit 78 is secured and sealed by means of annular weld 88. Obviously, usage of the sleeves or projections 70 and 82 permit ready removal of the conduit joined thereby simply by cutting the sleeve or projection adjacent the respective welds 72 or 88 and withdrawing the conduit therefrom.

An inwardly extending portion 92 of the outlet pellet conduit 80 is extended through an opening 90 formed at an L or other suitable bend in the coolant conduit 68. The inward portion 92 of the outlet conduit 80 terminates in a frustoconical 94, the outer edge of which is tapered outwardly and upwardly as denoted by reference character 96. When the outlet pellet conduit 80 is assembled in the manner previously described, the frustoconical connection 94 thereof is seated in a central opening 98 of the perforated plate 74, the edges of which opening are complementarily tapered at the reference character 96. Thus when the assembled inlet conduit 68 and outlet pebble conduit 80 with its associated frustoconical section 94 are positioned in the sleeve 70, the beveled edges denoted by the reference character 96 guide the frustoconical section 94 into seating engagement with the perforated plate 74. Fertile pellets 54 are added through the inlet pellet conduit 78 and withdrawn from the outlet pellet conduit 80 in a manner described more fully hereinafter in connection with FIG. 5 of the drawings.

When thus arranged it will be seen that the fertile pellets 54 substantially surround the entire core structure 14 and particularly active area 100 thereof. With this arrangement not only is a maximum conversion ratio of fertile to fissionable isotope attained but also the shielding characteristics of the fertile material is utilized to greatest advantage.

Figure 1:
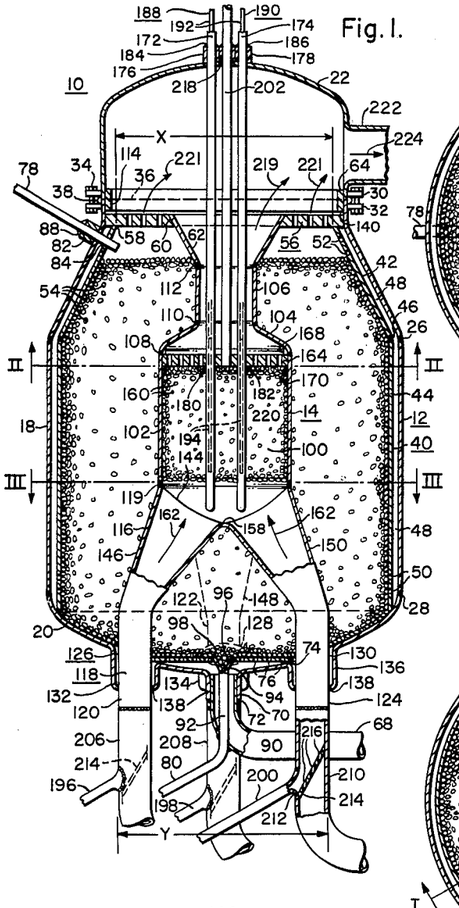
FIGURE 1 is a longitudinally sectioned view of one form of a fast breeder reactor constructed in accordance with the principles of the present invention.
Figure 2:
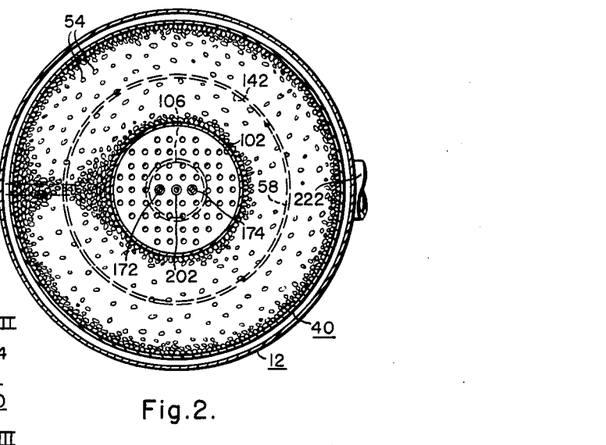
FIG. 2 is a cross-sectional view of the reactor shown in FIG. 1 and is taken along reference line II—II thereof.

Turning now to a more detailed description of the core structure 14, the latter component desirably is fabricated completely including assembling the fertile grid 56 prior to inserting the core structure 14 and the grid 56 into the reactor vessel 12. As shown in FIG. 1 of the drawings, the core structure 14 comprises a cylindrical cage 102, to the upper end of which is joined a frustoconical or reducing section 104. The reducing section 104 in turn is joined to an outlet conduit 106 which in turn is joined to the previously mentioned frustoconical nozzle 62 of the core assembly 14. The aforementioned joints desirably are made by means of annular weldments 108, 110 and 112, respectively. However, before the last one of the weldments 110 or 112 is made, the frustoconical section 62 is inserted into central opening 60 of the fertile grid 56. The opening 60 is provided with a downwardly and inwardly tapered edge portion so as to complementarily engage the upper outer surface of the frustoconical section 62. This engagement at least partially supports the core structure 14 and in addition stabilizes the core structure against radial movement relative to the vessel 12. Desirably the frustoconical section 62 is rigidly joined to the perforated plate 56, as by welding (not shown), to prevent relative longitudinal and radial movement between the plate or grid 56 and the core structure 14. In such case then, the lower extremity 114 of the hold-down projection 64 is spaced upwardly a short distance from the adjacent surface of the fertile grid 56, as indicated by reference character 140, to compensate for relative thermal expansion of the core structure 14 and the remaining components of the reactor 10.

The lower edge of the cylindrical cage 102 is joined to a common outlet section 116 of a multiple inlet conduit arrangement, denoted by the reference character 118, by means of an annular weldment 119.

The multiple inlet conduit system 118, which forms the lower portion of the core structure 14, includes at least two and any practical greater number of conduits joined in parallel to the connecting section 116. In this arrangement of the invention three such conduits 120, 122 and 124 are employed. The use of three such conduits is desirable to afford structural stability to the remaining core structure 14, to afford adequate cooling thereto for the size of reactor selected without the use of unusually large pipe sizes, and to obtain more uniform mixing of the incoming coolant in the connecting section 116 and more importantly in the active core area 100.

In this arrangement, the inner inlet conduit portions 120, 122 and 124 are extended through a like number of bottom vessel openings 126, 128 and 130 and outwardly projecting sleeve members 132, 134 and 136 secured to the bottom wall portion 20 at the aforementioned openings, respectively. The protruding ends of the inlet conduit portions 120, 122 and 124 are joined and sealed to the sleeve members 132, 134 and 136 by means of welds 138, respectively. Desirably an expansion bellows (not shown) is incorporated in each of the sleeves 132, 134 and 136 to provide for longitudinal thermal expansion of the core structure 14 relative to the reactor vessel 12. In this case the major support of the core structure 14 will be afforded by the blanket grid 56; in large reactors however, it is preferable to form the sleeves 132, 134 and 136 rigidly and to rely upon the space 140 between the blanket grid 56 and the hold-down projection 64 to compensate for thermal expansion. With this arrangement the entire core structure thus far described after assembly can be inserted or withdrawn as a unit into or from the vessel 12 after removal of the top plenum member 22. In furtherance of this purpose a circle 141 (FIG. 3), drawn tangently to the outer surfaces of the inlet conduit portions 120, 122 and 124, is smaller than an innermost edge 142 (FIG. 2) of the thermal shield 40. This is of course the largest radial section of the core structure 14, omitting from consideration the blanket grid 56. Accordingly, the core structure 14, including the blanket grid 56, can be inserted into and positioned within the vessel 12 after complete assembly of the latter.

Figure 3:
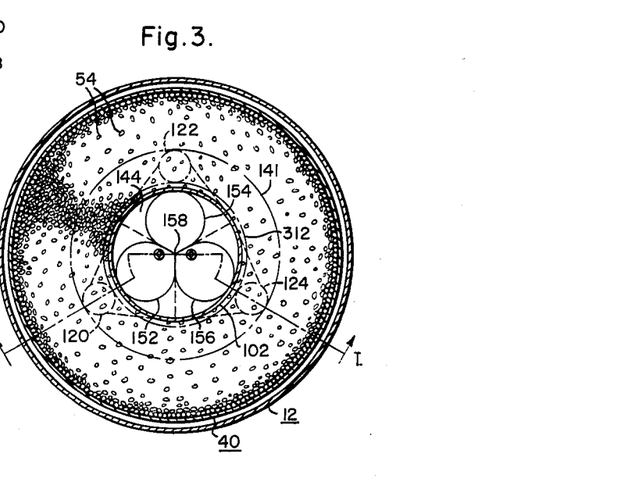
FIG. 3 is a cross-sectional view of the fast breeder reactor shown in FIG. 1 and is taken along reference line III—III thereof.

The inlet conduit portions 120, 122 and 124 are joined to a spheroidal bottom wall portion 144 of the cage 102 through expanding conduit connections 146, 148 and 150, respectively. Each of the expanding sections 146, 148 and 150 are given a non-circular contour at least at their upper openings so that when joined to the bottom wall 144 at similarly shaped openings 152, 154 and 156 thereof the central area of the bottom wall 144 of the core structure 14 assumes a tetrahedral formation 158 as viewed from the interior of the cage 102 (FIG. 3). The purpose of this tetrahedral formation 158 will be made apparent as this description proceeds.

During operation of the reactor 10, the active core area 100 thereof is substantially filled with UO$_2$ pellets 160 of desirably spherical configuration. As will be elaborated upon more fully, substantially all of the pellets 160 are maintained within the active core area 100 by the upward flow of the incoming coolant fluid as denoted by flow arrows 162. However, the pellets 160 are prevented from leaving the active core area 100 by a perforated core grid 164. The perforations 166 of the grid are, of course, made smaller than the pellets 160 so that the latter can not pass through the grid. The grid 164 is maintained in the position shown in FIG. 1 by means of a pair of annular shoulders 168 and 170 formed respectively on the reducing portion 104 and the core cage member 102 before the welded junction 103 is effected.

A pair of control rod shroud tubes 172 and 174 are inserted longitudinally into the reactor vessel 12 through outwardly extending projecting sleeves 176 and 178 secured at respective openings in the upper portion of the plenum member 22. When thus inserted, the shroud tubes 172 and 174 extend at least through the entire active portion 100 of the core structure 14. In furtherance of this purpose the core grid 164 is provided with apertures 180 and 182 in which the shroud tubes 172 and 174 are slidably fitted. The apertures 180 and 182 are aligned, when the core structure is assembled into the vessel 12, with openings in the sleeves 176 and 178 respectively. When the shroud tubes are mounted in this fashion, they are sealed hermetically from the interior of the vessel 12 and supported at the projecting sleeves 176 and 178 by annular weldments 184 and 186.

A pair of control rods 188 and 190 are slidably fitted into the shroud tubes 172 and 174, respectively. Each control rod includes a driving shaft 192 of rod configuration and an active portion 194 disposed adjacent the lower ends of the control rods as viewed in FIG. 1 of the drawings. The active portions 194 together contain 1800 grams of Boron–10 which is capable of absorbing sufficient fast neutrons to shut down the reactor 10 described herein when the latter is provided with 0.5% of excess reactivity. The control rods 188 and 190 are driven linearly in a conventional manner, for example, by any suitable linear driving mechanism.

The control rods also can be driven by a simple rack and pinion drive inasmuch as the shroud tubes 172 and 174 do not communicate with the reactor coolant as noted above. The position of each of the control rods 188 and 190 can be ascertained at any time during reactor operation by known assemblages of position indicating coils which usually take the form of a tandem series of inductances and suitable measuring circuitry, for example, an inductance bridge.

Although the control rods 188 and 190 in this example contain sufficient absorbing material to shut down the reactor, it is contemplated that they function chiefly as a shim and normal shut-down control for the reactor and that the reactor can be shut-down upon an emergency or scrammed reliably by additional, fail-safe means presently to be disclosed.

The pellets 160 are added or withdrawn relative to the active core area 100 by means of inlet conduit sections 196, 198 and 200 and outlet conduit 202 respectively. Each of the inlet conduit sections 196, 198 and 200 are joined to a common inlet conduit 204 for purposes described hereinafter in connection with FIG. 5. The respective junctions between the connecting conduits 196, 198 and 200 and the inlet coolant conduits 206, 208 and 210 are substantially similar; and accordingly only the junction between the inlet pellet section 200 and the inlet coolant conduit 210 will be described in detail, with reference to FIG. 1. The adjacent extremity of the inlet pellet section 200 is flared as denoted by the reference character 212 in order to minimize or prevent erosion of the pellets 160 as they enter the larger conduit 210. A screen member 214 is positioned within the coolant conduit 210 up-stream of the junction between the coolant conduit 210 and the pellet conduit 200 to prevent pellets from entering the lower portions of the conduit 210. The screen 214 is provided with a plurality of perforations 216 so that coolant fluid can pass therethrough and thence can carry any pellets added from the conduit section 200 into the active core area 100.

The outlet core pellet conduit 202 is inserted centrally through the plenum member 22 by a sleeve and weld arrangement denoted generally by the reference character 218 and constructed in a manner similar to that described previously in connection with sleeves 176 and 178 and welds 184 and 186 of the control rod shroud tubes. When thus inserted, the inward end of the pellet conduit 202 extends just through an aperture 220 formed centrally in the core grid 164; the aperture 220 of course is aligned with the opening in the welded sleeve arrangement 218. The aforesaid inner end of the conduit 202 desirably is slip-fitted into the central aperture 220 to permit installation of the outlet core pellet conduit 202 after the core structure 14 is assembled into the reactor vessel 12. When thus assembled the core grid 164 affords lateral stability not only to the conduit 202 but also to the control rod shroud tubes 172 and 174. Use of the shroud tubes 172 and 174 is desirable, of course, in order to prevent interference of the absorbing sections 194 of the control rods by contact with the core pellets 160 during operation of the reactor.

The core pellet conduits 202, 196, 198 and 200 are fabricated from standard 2″ stainless steel piping, while on the other hand the connecting coolant sections 120, 122 and 124 as well as the inlet conduits 206, 208 and 210 are formed from 8″ schedule 40 stainless steel piping. With the exception of pellet conduit 202 the aforementioned conduits can be fabricated from type 304 stainless steel for economy. Inasmuch as it is expected that the maximum core temperature will exceed 1000° F. the pellet conduit 202 together with the shroud tubes 172 and 174 preferably are fabricated from type 316 stainless steel which is capable of service above 1000° F.

As indicated previously, both the blanket pellets 54 and the core pellets 160 may take the form of small spheres or balls, although other shapes can be used if desired. The use of spheres, however, is considered advantageous inasmuch as the minimum porosity of a packed pebble-bed made up of spheres is approximately 40% irrespective of the diameter of the spheres. Depending upon ease of manufacture and the available pressure drops across the core structure 14 the diameter of the spheres can vary in the neighborhood of between 1/8″ and 1/2″. Desirably the blanket spheres 54 are of the same diameter as the core spheres 160 so that the blanket spheres 54 can be introduced into the core structure after the blanket spheres have been enriched by neutron irradiation. Although not absolutely essential, it is desirable that the core spheres and the blanket spheres be of uniform diameter in each case; otherwise the minimum porosity of a packed bed made up of both types of these spheres will be variable.

It is contemplated that the fuel or core pellets 160 be of moderate to high enrichment or in the range of about 25% to 90%. $U^{233}$, $U^{235}$, and $Pu^{239}$ are suitable enriching isotopes. The balance of the material of the fuel pellets 160 can be a fertile material such as $U^{238}$ or thorium. As noted previously the blanket pellets can be drained out of the fertile area 16 after a period of neutron irradiation and sent to a processing plant; or if they are of substantially the same size as the core fuel, they can be used directly in the reactor as partially enriched fuel. As noted previously, a fast reactor is insensitive to fissional product poisoning and hence "dirty plutonium," having a high $Pu^{240}$ content, is a suitable fuel.

Because of the elevated temperatures involved, the fuel pellets 160 preferably contain the fissile material in the form of a corresponding oxide, for example, uranium dioxide ($UO_2$). The fissile material of the blanket pellets 54 can be either in metallic form or in the form of the oxide; however, if it desired to use the blanket pellets 54 directly in the reactor core 14 after their enrichment in a blanket area 16, the fissible material of the blanket pellets 54 preferably is in the form of its oxide. The blanket and core pellets desirably are each clad with 5 to 10 mils of stainless steel. Type 316 stainless steel is desirable inasmuch as the maximum surface temperature of the fuel pellets 160 is about 1500° F. during operation of the reactor. It is also contemplated that zirconium or one of its alloys can be employed as the cladding material, although at present the stainless steels are more economical. The cladding, of course, prevents the spread of fissional products from the fuel pellets and also reduces their erosion damage. Hence, the cladding material can be selected principally on the basis of its toughness and integrity, particularly since the presence of structural materials in the reactor have little effect on neutron economy in case of fast neutrons. As pointed out previously, unclad pellets can be employed, which, of course, are easier to fabricate; however, more extensive shielding and remote maintenance would be required.

As indicated in FIG. 1 of the drawings, the major proportion of the coolant is circulated through the core structure 14. This is necessary not only to maintain the pellets 160 in a packed relationship against the core grid 164 but also because of the much higher power density in the active core area 100. Although packed bed pressure drops are fairly high and vary as the length of the bed and the square of the coolant velocity, the use of Na, NaK, or other liquid metals minimizes this problem. This follows from the fact that high heat transfer coefficients can be achieved with liquid metals at only nominal flow velocities, that is in the range of 4 to 10 ft. per second. This velocity range produces coolant film coefficients of 2400 to 12,000 B.t.u./hour/ft.$^2$/° F. Furthermore, liquid metals have exceptionally high boiling points at atmospheric pressure or in the order of 1500 to 1620° F. Accordingly, an exceptionally large temperature rise can be employed across the core structure 14 without danger of boiling the coolant in the hottest portions of the active core area 100. It follows, then, that power densities in the active core area 100 may be as high as 25,000 kw. per cubic foot; however, the 15,000 to 20,000 kw. per cubic foot range results in a more practical requirement of coolant pumping power.

The pellet bed fast reactor described herein lends itself to continuous fuel handling since both the blanket pellets 54 and the fuel pellets 160 can be fluidized in a known manner by the coolant flow therethrough. In furtherance of this purpose the blanket pellets 54 can be maintained during operation of the reactor at the initial stages of fluidization by coolant flow therethrough without materially decreasing the total or packed volume of blanket pellets. For further fluidization a larger blanket coolant conduit 68 can be employed together with separate pumping means (not shown). On the other hand, the core bed 100 is maintained in a state transcending that of a typical fluidized bed so that the pellets 160 are supported in packed relation against the core grid 164 by upward flow of the coolant, as viewed in FIG. 1 of the drawings. Numerous experiments have shown that high density pellets can be fluidized at velocities of 2 to 6 ft. per second of Na or NaK.

The power cycle of a sodium cooled fast reactor disclosed herein is equivalent to the best conventionally fired steam stations of the present time. It is known that the sodium can be heated in excess of 1300° F. in a reactor of this type without exceeding material limitations. Accordingly, 1150° F. steam can be generated from a heat source of this character. It follows then, that overall power plant efficiencies in the range of 38% to 44% are available.

Figure 5:
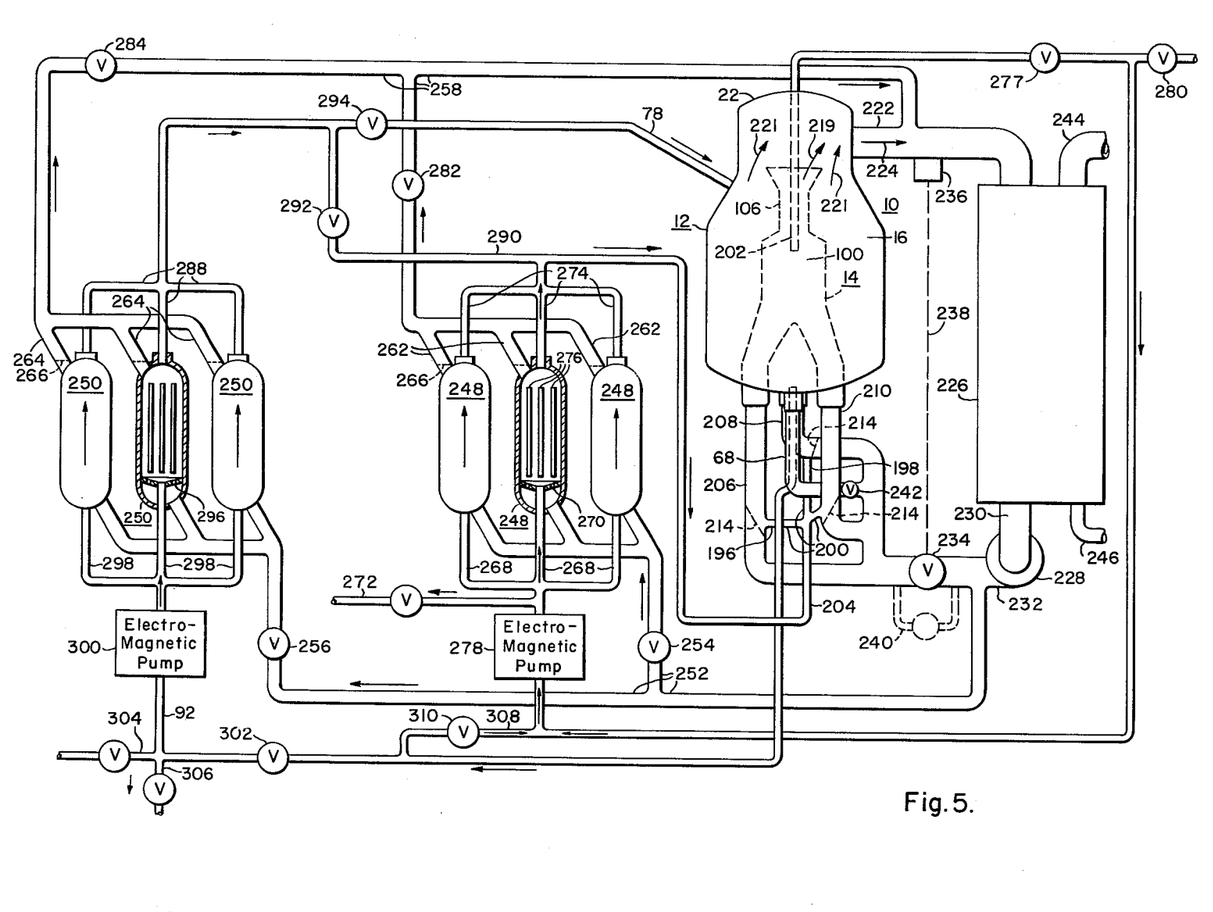
FIG. 5 is a schematic fluid diagram showing the fuel handling and primary cooling systems employed with the reactor of FIG. 1.

Referring now to FIG. 5 of the drawings, the primary and fuel handling systems are illustrated schematically therein. As will be described in detail later on, the heated coolant fluid issuing from the core structure outlet 106, indicated by flow arrow 219, is combined in the plenum member 22 with the heated coolant issuing from the blanket section 16, as denoted by flow arrows 221. The combined fluid then passes out one or more outlet conduits 222 of the plenum member 22, as shown by flow arrow 224 (FIG. 1). In this arrangement of the inventon, only one outlet conduit 222 is required due to the relatively low volume of liquid metal coolant required.

From the outlet conduit 222 the coolant passes through a liquid metal-water heat exchanger 226 of known design (see Liquid Metals Handbook Sodium-NaK Supplement pp. 272–287, July 1955, Atomic Energy Commission, Dept. of the Navy, Washington, D.C.). The coolant is circulated through the primary system by means of the liquid metal hermetically sealed pump 228, which is coupled through its inlet conduit 230 to the liquid metal outlet of the heat exchanger 226. Suitable pumps of this character are available from various manufacturers in the atomic equipment field. An outlet 232 of the pump in turn is coupled through valve 234 to the branched core inlet conduits 206, 208 and 210 and to the single blanket inlet conduit 68.

The valve 234 desirably is set automatically by suitable temperature sensing means 236 associated with the outlet conduit 222 and by known controlling circuitry denoted by dashed line 238 in a manner so that additional coolant can be furnished to the reactor 10 in the event of acceptable temperature variations and so that the valve 234 can be closed to shut down or scram the reactor 10, in a manner described more fully hereinafter, in the event that the temperature rise is excessive. In the latter event, a bypassing conduit 240 can be employed to supply a limited amount of coolant to the reactor 10 in order to remove the decay heat therefrom when the reactor is in its shutdown position.

The bypassing conduit 240 is five inches in inside diameter and is capable of inducing an interstitial coolant flow through the core structure 14 of one to two feet per second which is incapable of starting up the reactor 10 by fluidizing and impacting the core pellets 160 against the core grid 164. The conduits 222, 230 and 232 are approximately 15 inches in inside diameter in order to handle the combined coolant streams passing through the core structure 14 and the fertile area 16. In one arrangement it is contemplated that approximately 90% of the total reactor coolant will flow through the core structure 14 and thus the outlet conduit section 106 thereof need be only 14 inches in inside diameter to correspond volumetrically with the inlet core conduits 120, 122, 124 (FIG. 1). An additional valve 242 is located in the blanket inlet conduit 68 so that proper proportioning between the core and blanket coolant streams can be effected.

The steam generated by the heat exchanger 226 is conducted through a steam conduit 244 to known forms of dynamoelectric machines for conversion into electric power or to other desired applications of the steam. The steam condensate is returned to the heat exchanger 226 through the feed water inlet conduit 246.

Series of storage tanks 248 and 250 are provided respectively for storage of the core pellets 160 and the blanket pellets 54. A stream of fluidizing coolant can be supplied to either or both of the storage tanks 248 and 250 through the branched conduit arrangement denoted generally by the reference character 252 with the branches thereof coupled to the respective series of tanks 248 and 250 and being controlled by throttling valves 254 and 256 respectively. A similar branched conduit arrangement 258 couples each of the tanks 248 and 250 adjacent the top portions thereof to the reactor outlet conduit 222. The branched conduit arrangement 252 is coupled to a primary reactor loop 260 between the primary pump 228 and the primary valve 234 so that fluidizing coolant can be supplied to the storage tanks at all times when desired, including such time when the reactor 10 is not in operation. The branched conduits 252 and 258 desirably are uniform in size throughout, in this example, 3" in inside diameter, for it is contemplated that the total fluid bled and fed relative to primary loop 260 can pass through one or the other of the series of tanks 248 and 250. Each of individual storage tank coolant outlets 262 and 264, respectively, are provided with screen members 266 positioned adjacent its junction with the tank 248 or 250 to prevent the pellets, when fluidized within the tanks 248 and 250 from entering the outlet coolant stream flowing through the branched conduit arrangement 258.

With particular reference to the storage tanks 248 the fuel pellets 160 are conducted from the core structure 14 through the core outlet pellet conduit 202 described previously and a branched storage tank inlet conduit 268, the branches of which extend through the bottom ends of the tanks 248 respectively and through a central opening in a perforated plate 270 disposed adjacent the bottom of each tank 248. Desirably the plate 270 is of a slightly conical or dished configuration to permit complete draining of the pellets confined within each tank 248 through a valved drain conduit 272.

When a fluidized coolant is circulated through the tanks 248, the core pellets are guided upwardly toward pellet outlet conduits 274, by means of guide vanes 276 disposed in each tank and extending longitudinally thereof, under the impetus of the fluidizing coolant circulated through the tanks in the manner described above. From the pellet outlet conduits 274 the pellets are conducted through the aforementioned conduit 204, through the individual sections 196, 198 and 200, and into the inlet coolant conduits 206, 208 and 210. In this manner the core pellets when filling or adding to the core structure 14 can be supplied to each of the core coolant inlets 206, 208 and 210 at positions down stream of their protective screens 214. On the other hand, pellets are withdrawn from the core 14 under the fluidizing impetus of the upward passage of coolant therethrough and are conducted through the aforementioned core outlet pellet conduit 202 and a branched inlet conduit 268 to the series of tanks 248, upon suitable manipulation of valve 277. In the event that the upward force of the reactor coolant is not sufficient for this purpose, a suitable pumping means, for example, an electromagnetic pump 278 is coupled into the branched inlet conduit 268. Initially, however, core pellets can be supplied to the reactor system described herein from a suitable external source by means of a valved conduit indicated by the reference character 280.

The storage tank system for the blanket pellets 54 operates in a similar manner. The fluidizing coolant stream is directed through the tank 250 by means of the aforedescribed branched conduit 252 and 258 and by suitable manipulation of valves 254 and 256 and of valves 282 and 284. Under impetus of the upward flow of coolant through the tanks 250, pellets are transferred to the blanket area 16 (FIG. 1) through the previously described pellet inlet conduit 78 and the branched tank outlet network 288. In the event that a tank 250 contains enriched pellets as a result of a period of irradiation within the fertile or blanket region 16 of the reactor 10, the pellets can be directed through the core inlet pellet conduit 204 through a connecting conduit 290 by suitable manipulation of valves 292 and 294.

The pellets in the storage tanks 250 are fluidized in a manner similar to that described in connection with the tanks 248, and in furtherance of this purpose coolant is conducted to the bottom portions of the tanks 250 through the aforedescribed branched coolant inlet network 252 by suitable manipulation of the valve 256. On the other hand the pellets themselves are admitted above perforated plates 296 through the blanket pellet conduit 80 described previously and a branched inlet pellet conduit system 298. The pellets are moved through the conduits 80 and 298 by means of an electromagnetic pump 300. Upon opening of valve 301 pellets also can be added from an external source by means of valved conduit 304 connected to the outlet pellet conduit 80. Similarly, drainage of the storage tanks 250 can be effected through a valved conduit 306. On the other hand, if the blanket pellets 54 are suitably enriched, they can be conveyed to the core pellet storage tanks 248 through conduit 308 coupled between the blanket pellet conduit 80 and the core pellet outlet conduit 202, upon suitable manipulation of valves 302 and 310.

In the operation of the fast breeder reactor, according to the present understanding of the invention and with reference to FIG. 5, coolant is admitted at the bottom of the fertile region 16 by means of the central inlet coolant conduit 68 by operation of the pump 228. The pump 228 also conveys coolant to the core region 100 through the three core coolant inlets 206, 208 and 210. The force of the coolant flowing upwardly through the core structure 14 causes the core pellets 160 to impact against the core grid 164 (FIG. 1) in an inverted packed bed relationship, as it were.

In this example, the fertile pellets 54 also are in a packed relationship so that the porosity of each bed 16 or 100 is about 38% where, as here, spheroidal pellets 54 and 160 (FIG. 1) respectively are employed. As shown in the following example, only a relatively small proportion of the coolant is admitted to the fertile area 16 with the result that the velocity thereof is insufficient to fluidize the pellets 54.

After passing through the apertures 166 of the core grid 164 (FIG. 1), the core coolant is admitted to the plenum member 22 through the core outlet 106 and the nozzle 62. Use of the nozzle 62 promotes intimate mixing of the core coolant with that coolant portion entering the plenum member 22 from the fertile region 16 through the apertures 59 of the blanket grid 56. Desirably the center to center spacings of the apertures 59 and of apertures 166 of the blanket and core grids 56 and 164, respectively, are less than the diameter of the spheres 54 and 160, respectively, to prevent some of the pellets from seating into the adjacent edges of the apertures 59 and 166 and from thereby impeding coolant flow through these apertures.

After mixing in the plenum member 22, as described, the combined core and blanket coolant flows out of the reactor vessel through the outlet conduit 222 so that the heat of the fast fission reaction within the reactor vessel 12 is conveyed to the heat exchanger 226 in the manner described previously in connection with FIG. 5 of the drawings. Various known control arrangements can be coupled between the control rod drive mechanisms and the dynamo-electric machinery, or other load device to which steam flowing through the conduit 244 is applied, in order to relate the positions of the control rods 188 and 190 (FIG. 1) to the power demands upon the reactor system. Such arrangements are well known in the instrumentation art and need not be further described herein.

Figure 4:
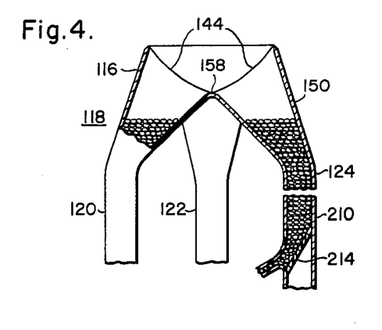
FIG. 4 is a partial longitudinally sectioned view of the reactor shown in FIG. 1 and illustrating the shut down or scrammed condition of the reactor.

When it is necessary to shut down the reactor for an extended interval, the valve 234 is manipulated until the coolant flow through the core structure 14 is decreased below approximately 2 ft. per second in the interstices of the pellet bed, so that the pellets 160 can no longer be supported in packed relationship by the coolant flowing upwardly through the core structure 14. As a result the pellets 160 fall downwardly of the core structure 14, as viewed in FIG. 1, into three separate groupings positioned respectively in the core structure legs 120, 122 and 124, as shown in FIG. 4 of the drawings; and the chain reaction terminates. In the latter, separated positions the pellets 160 can never become critical; therefore, in the event of a complete loss of coolant flow due to the occurrence of some contingency such as pump failure or loss of electric power, the reactor 10 is fail-safe as a direct result of this event.

When in the position shown in FIG. 4, the pellets 160 are prevented from entering the coolant circuit of the primary loop 260 of the reactor system by the screen members 214 positioned in each of the conduits 206, 208 and 210 as better shown in FIG. 5 of the drawings. The aforementioned interstitial coolant velocity of about 2'/sec. desirably is maintained until the decay heat is substantially removed. For short periods of down time, the reaction can be terminated as aforesaid by insertion of the control rods 188 and 190, while maintaining partial or full coolant flow; that is to say, a flow above the minimum velocity for maintaining the core pellets 160 in the packed condition. In the event of a contingency such as an undue increase in neutronic flux, both insertion of the control rods 188 and 190 and collapse of the pellet bed to the non-critical arrangement of FIG. 4 can be effected by known instrumentation associated with the control rod drives and with the valve 234, to provide an additional safety factor.

At the beginning of reactor operation, the core cage 102 is capable of containing more than enough pellets 160 to sustain a fast chain reaction when the pellets are in the operating or packed state in the core region 100. In such case the control rods 188 and 190 are substantially fully inserted as shown in FIG. 1 in order to compensate or counteract the desired excess reactivity initially provided in the packed group of pellets. Accordingly, the core region 100 contains about 0.5% excess pellets or in other words 0.5% of excess reactivity, as noted previously. This excess reactivity represents, of course, the fully packed condition of the pellets 160; and hence a measure of control can be afforded by suitable adjustment of the valve 234 to reduce coolant flow slightly (FIG. 5) so that part or all of the pellets 160 become freely movable while in the closely spaced relationship, or in other words fluidized. Increasing the physical spacing between the pellets 160 of course has the effect of increasing the total number of critical mass of core pellets 160 necessary to produce a coefficient of reactivity equal to one for a given pellet enrichment. Such fluidization techniques are discussed in detail in "Unit Operations" by G. C. Brown, John Wiley and Son, New York, 1950. The size of the pellets is unimportant since, in the case of spherical pellets, the porosity of the pellet bed in the collapsed or packed condition is about 40% regardless of the diameter of the pellets. Experiments have shown that spherical pellets up to ½" in diameter can readily be fluidized by techniques described herein and in Brown, supra. These experiments and the application of the techniques described in Brown to a fluidized reactor is described in greater detail in Westinghouse Research Report CCR–3054 dated June 11, 1953 and entitled "Hydraulic Fluidization of Beds of Spheres." The use of a packed bed sustained by an upward flow of coolant, however, is advantageous in comparison to a typically fluidized bed in that attrition of the fuel pellets 160 is greatly reduced. This unpublished report deals with fluidization of pellets and particles of greater size and density than those presently employed in known experiments or other usage. The report concerns, inter alia, fluidizing lead spheres having a diameter of 0.371" and is summarized with reference to FIGS. 6 and 7 of the drawings and the following Tables I, II and III.

Figure 6:
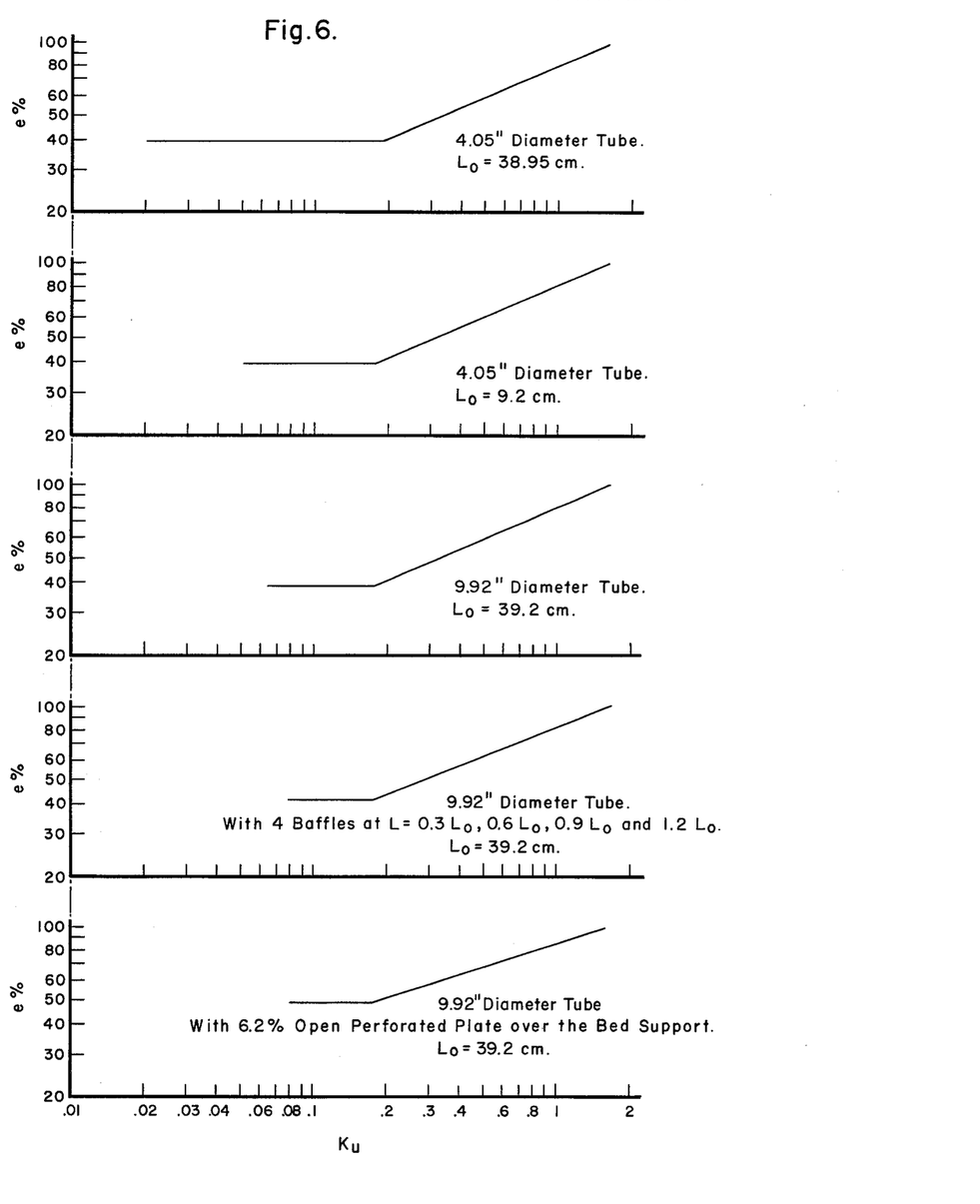
FIG. 6 is a series of graphs showing the effect of bed geometry on the expansion of a bed of .371" diameter lead spheres fluidized by water at 90° F.

FIG. 6 presents a series of curves demonstrating the feasibility of fluidizing 0.371" lead spheres in beds of differing geometry as indicated. In these curves varying porosity or percent void ($e$) of the bed is plotted vs.

$$K_u = u \sqrt{\frac{\rho}{g D_P (\rho_s - \rho)}}$$

=ratio of the superficial velocity to the terminal velocity or velocity of coolant for the 100% void condition times $$\sqrt{\frac{3C_d}{4}}\,)$$

with the square root radical being in the denominator of the ratio.

Figure 7:
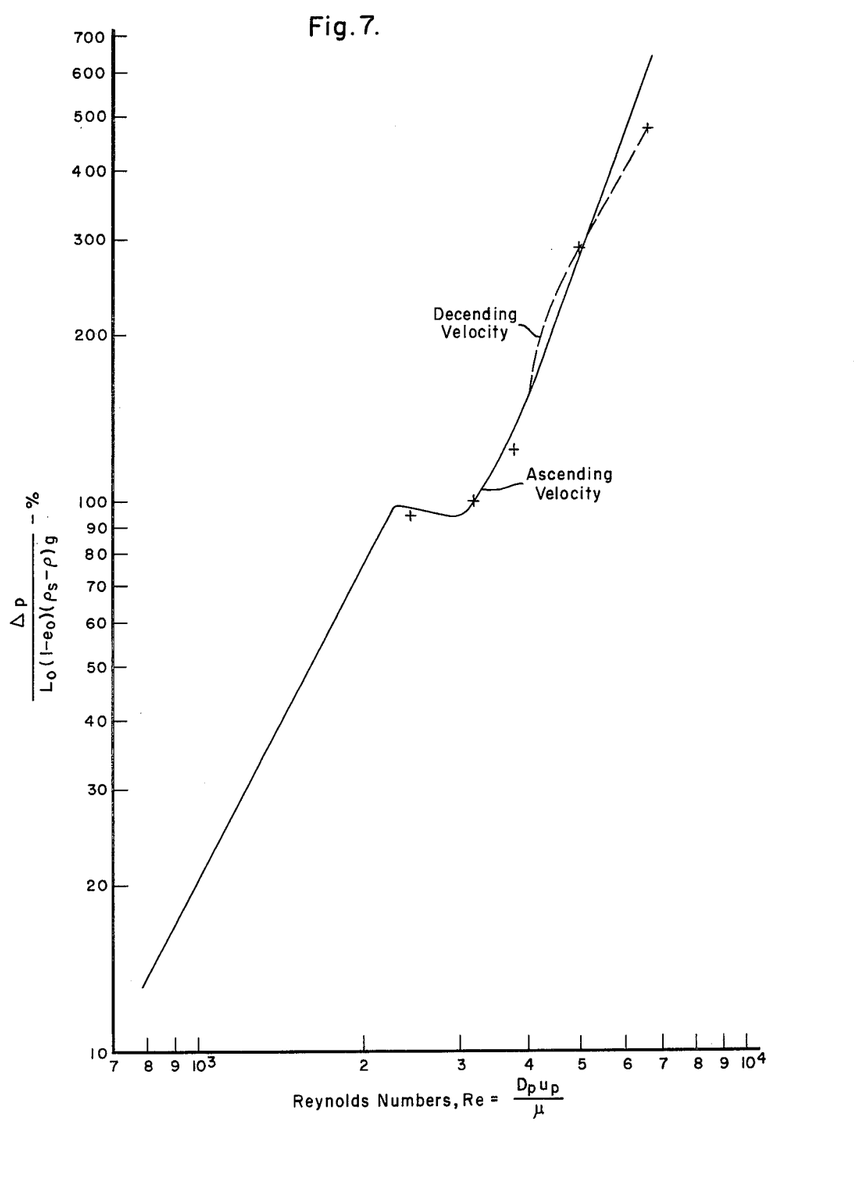
FIG. 7 is a graph showing the characteristics of an inverted packed or fixed bed of .371" diameter lead spheres impacted against a screen by upward flow of water.

The curve of FIG. 7 illustrates attainment of the inverted packed bed condition, such as that shown in FIG. 1, with 0.371" lead spheres. The curve is obtained by plotting $K_p$ vs. $Re$. This graph is further explained by the following excerpt from the aforementioned Westinghouse report:

"If very high flow rates are required through a bed and it is essential that equal amounts of fluid flow through all parts of the bed, then a fixed bed should be considered. This fixed bed could be formed by limiting the expansion of a fluidized bed by placing a screen or similar restriction within the column at some bed height, say $L=1.2\ L_o$. The bed's initial expansion would be normal until the first ball reaches the screen. As soon as enough balls reach the screen to reduce the open area appreciably, they stick and from then on most all balls that touch the bottom of the bed stick. The test conducted in the 9.92 inch ID tube with the bed up against the screen showed an increase in bed depth with each increment of velocity increase until most of the balls were against the screen and only a few remained on the lower support. $K_p$ increased to some value near the fluidizing point and remained there until the balls started to stick to the upper screen. Then the pressure drop increased with increasing velocity as shown by the curve of $K_p$ vs. $Re$, FIGURE 7. The portion of the curve with $K_p>1$ is the region where the bed was increasing in thickness with each positive velocity increment. The slope of the $K_p$ vs. $Re$ curve increases slightly with Reynolds Number as the bed depth increases. The plus signs on this curve indicate decreasing velocity points and for the topmost points the entire bed is up against the screen. These points of constant fixed bed height against the screen show the typical slope of about 1.8 except from an ordinary fixed bed."

In forming the graphs of FIGS. 6 and 7 the following data abstracted from the above mentioned Westinghouse Report were used in which Tables I and II represent points on the second and third curves respectively from the top of FIG. 6 and Table III represents points on the curves of FIG. 7.

TABLE I

[0.371 inch diam. lead shot (No. 1 Buckshot) 90° F.]

| L cm | $\dfrac{\Delta p}{L_o(1-e_o)(\rho_s-\rho)g}$ | $e$ | $u$, ft./sec. | $Re = \dfrac{D_p u \rho}{\mu}$ | $u\sqrt{\dfrac{\rho}{gD_p(\rho_s-\rho)}}$ |
|---|---|---|---|---|---|
| 9.2 | 5.5 | 39.53 | .161 | 603 | .0500 |
| 9.2 | 28.3 | 39.53 | .372 | 1,394 | .116 |
| 9.2 | 84.2 | 39.53 | .579 | 2,169 | .180 |
| 9.35 | 88.6 | 40.5 | .611 | 2,289 | .190 |
| 18.2 | 103.6 | 69.3 | 1.942 | 7,276 | .604 |
| 66.5 | ------ | 91.6 | 4.19 | 15,680 | 1.304 |
| ---- | ------ | 100.0 | 5.113 | 19,157 | 1.591 |

$\mu = 1.845$ lb./ft. hr., $D_t = 4.05$ inches, $L_o = 9.2$ cm., $e_o = 39.53\%$, $\rho_s = 21.980$ slugs/cu. ft. $\rho_s - \rho = 20.049$ slugs/cu. ft., Bed wt. = 11.52 lbs.

TABLE II

[0.371 inch diam. lead shot (No. 1 buckshot) 90° F.]

| L cm | $\dfrac{\Delta p}{L_o(1-e_o)(\rho_s-\rho)g}$ | $e$ | $u$, ft./sec. | $Re = \dfrac{D_p u \rho}{\mu}$ | $u\sqrt{\dfrac{\rho}{gD_p(\rho_s-\rho)}}$ |
|---|---|---|---|---|---|
| 39.2 | 15.0 | 38.79 | .210 | 787 | .0653 |
| 39.2 | 47.1 | 38.79 | .416 | 1,559 | .129 |
| 39.2 | 89.7 | 38.79 | .582 | 2,181 | .181 |
| 39.3 | 93.0 | 39.0 | .597 | 2,340 | .186 |
| 57.9 | 98.4 | 58.6 | 1.542 | 5,762 | .480 |
| 81.8 | 100.2 | 70.7 | 2.238 | 8,691 | 0.696 |
| ---- | ------ | 100.0 | 5.113 | 19,157 | 1.591 |

$\mu = 1.845$ lb./ft. hr., $D_t = 9.92$ inches, $L_o = 39.2$ cm., $e_o = 38.79\%$, $\rho_s = 21.980$ slugs/cu. ft., $\rho_s - \rho = 20.049$ slugs/cu. ft., Bed wt. = 298.74 lbs.

TABLE III

[0.371 inch diam. lead shot (No. 1 buckshot) 90° F.]

| L cm | $\dfrac{\Delta p}{L_o(1-e_o)(\rho_s-\rho)g}$ | $e$ | $u$, ft./sec. | $Re = \dfrac{D_p u \rho}{\mu}$ | $u\sqrt{\dfrac{\rho}{gD_p(\rho_s-\rho)}}$ |
|---|---|---|---|---|---|
| Points for Ascending Velocity | | | | | |
| 41.8 | 20.9 | 42.8 | 0.334 | 1,251 | ------ |
| ---- | 97.0 | ---- | 0.641 | 2,402 | ------ |
| 42.9 | 94.7 | 44.1 | 0.733 | 2,746 | ------ |
| 44.9 | 97.5 | 46.6 | 0.830 | 3,110 | ------ |
| 44.9 | 128.1 | 46.6 | 0.974 | 3,649 | ------ |
| 44.9 | 477.4 | 46.6 | 1.722 | 6,452 | ------ |
| Points for Descending Velocity | | | | | |
| 44.9 | 485.6 | 46.6 | 1.764 | 6,609 | ------ |
| 44.9 | 287.2 | 46.6 | 1.328 | 4,976 | ------ |
| 44.9 | 133.8 | 46.6 | 0.992 | 3,717 | ------ |
| 44.9 | 99.8 | 46.6 | 0.851 | 3,189 | ------ |
| 44.9 | 95.2 | 46.6 | 0.661 | 2,477 | ------ |

$\mu = 1.845$ lb./ft. hr., $D_t = 9.92$ inches, $L_o = 39.2$ cm., $e_o = 38.79\%$, $\rho_s = 21.980$ slugs/cu. ft., $\rho_s - \rho = 20.049$ slugs/cu. ft., Bed wt. = 298.74 lbs., 16 x 16 mesh horizontal screen at 44.9 cm. ($L_{screen} = 1.14 L_o$).

Following is a list of symbols and their definitions as employed in the foregoing discussion and graphs:

$A_t$=mean cross sectional area of fluidizing column, sq. in.
$C_d$=drag coefficient of a spherical particle
$D_t$=internal diameter of the fluidizing column, ft.
$D_p$=weight mean average diameter of spheres or shot, ft.
$\epsilon$=percent void of bed $$\frac{\left[1-\frac{\text{Bed wt. } (1738)(2.54)}{(\rho_s)(g)A_t \times L_o}\right]L_o + L - L_o}{L}$$

$e_o$=percent void of bed in most settled position
g=gravitational constant 32.17 ft./sec.$^2$ $$K_p = \frac{\Delta p}{L_o(1-e_o)(\rho_s - \rho)g}$$

ratio of hydraulic force on bed to the apparent weight of the bed. (dimensionless)

$$K_u = u\sqrt{\frac{\rho}{gD_p(\rho_s - \rho)}}$$

ratio of the superficial velocity to the (terminal velocity times $\sqrt{\frac{3C_d}{4}}$) (dimensionless)

$L$=average height of bed, cm.
$L_o$=height of bed in its most settled position, cm.
$\Delta p$=pressure drop across the bed, lb./sq. ft.

$Re$=Reynolds Number=$\frac{D_p u \rho}{\mu} \times (3600)$ sec./hr.

$\times 32.17$ ft./sec.$^2$ $u$=superficial fluid velocity based on $A_t$, ft./sec.
$\rho$=fluid density, slugs/cu. ft.
$\rho_s$=ball density, slugs/cu. ft.
$\mu$=fluid viscosity, lb./ft. hr.

In an erosion test, a bed of ¼ inch diameter naval bronze spheres was placed in a 4.05 inch diameter fluidizing column and fluidized to $L=1.2L_o$ by water at an average temperature of 74° F. The balls were run for a total of 332 hours and showed an average daily weight loss of only 0.0044%. Since bronze is softer than stainless steel and since the fuel pellets are relatively fixed during operation of the present invention, the indicated stainless steel cladding would appear adequate.

However, since the pellets form the inverted packed bed (FIG. 1) over a relatively wide range of coolant velocities, the reaction desirably is controlled by adjustment of the control rod 188 and 190. Control of excess reactivity also can be effected by the addition or withdrawal of fuel pellets relative to the core area 100.

A central station power plant embodying the principles of the present invention will now be described. The gross power output of this reactor system is 174 megawatts thermal. The reactor primary coolant conditions, described below, are fixed by the selection of a standard type of steam turbine having a 66,000 kilowatt T.C.D.F. machine with a heat rate of 8955 B.t.u. per kilowatt hour. The turbine cycle efficiency of this machine is 38%, with steam inlet conditions of 950° F. and 1250 p.s.i.g. The gross electric output of the central station reactor therefore, is 66 megawatts electrical. Of this output, 1.6 megawatts (electric) are consumed by the primary coolant pump 228 (FIG. 5) and 3.4 megawatts (electric) are utilized in various auxiliary equipment leaving a net electric output of 61 megawatts. The overall plant efficiency therefore is 35%.

The radial and axial flux distributions across the core area 100 vary about 139% and 144%, respectively, from the maximum to average conditions, with the result that an overall hot-channel factor of about 2.0 is induced. About 10% of the total reactor heat is generated in the blanket area 16. Accordingly, approximately nine times as much coolant fluid is admitted to the core structure 14 through the conduits 206, 208 and 210 as is admitted to the fertile area 16 through the conduit 68.

In this arrangement of the invention the outside diameter of the cylindrical portion 18 of the vessel 12 is about seven feet as noted above and tapers to a diameter of about four and one-half feet at the plenum member 22; on the other hand the maximum outside diameter of the thermal shield 40 is 80 inches leaving an annular flow space 48 between the thermal shield and the vessel wall of one inch. On the other hand, the core cage 102 forming part of the core structure 14 has an outside diameter of approximately 31 inches and a height of about 30 inches. Allowing for the aforementioned wall thickness of the core structure 14 and for insertion of the core grid 164, the active core area 100, occupied by the pellets 160 during operation of the reactor, is 27 by 30 inches in height and diameter, respectively. However, the length of the absorbing section 194 of each control rod 188 and 190 is approximately 32 inches in order to span the entire height of the active core area in the event that the pellets 160 are at least partially fluidized, i.e. the flow velocity or pressure drop is slightly less than that required to urge the pellets 160 into a completely packed relation. In this example, however, it is contemplated that the reactor 10 will be operated with the pellets 160 packed against the core grid 164 by the upward flow of the coolant and that the excess reactivity of the packed core will be controlled by appropriate insertion of the control rods 188 and 190. When operated in this manner and with the quantity of core pellets designated below, the excess reactivity of the core area 100 will be about .5%, which can be overridden by insertion of the control rods 188 and 190 having active portions 194 containing a total of 1800 grams of Boron–10, as aforesaid. This quantity of neutron absorbing material is capable of capturing sufficient fast neutrons to terminate the chain reaction, when either of the control rods 188 and 190 is fully inserted.

The core inlet conduits 120, 122 and 124 desirably are arranged outwardly of a circle 312 (FIG. 3), which is larger than the outer diameter of the core cage 102, in order to minimize radiation streaming from the active core area 100 outwardly of the reactor vessel through the coolant conduits 120–206, 122–208, and 124–210. As a result substantial radiation shielding for the active core area 100 is afforded by the fertile pellets disposed directly beneath the core area 100.

In order to produce about 550,000 lbs. per hour of steam necessary for the aforementioned steam turbine of the capacity indicated, 4,030,000 lbs. per hour (9,700 gals. per minute) of liquid sodium is supplied to the heat exchanger 226 at a temperature of 1150° F. and a pressure of 50 p.s.i.g. The liquid sodium exits from the heat exchanger 226 at a temperature of 651° F. and, after passing through the pump 228, enters the respective core and fertile areas through the conduits described previously at a temperature of 655° F., with about 4° F. having been added to the liquid sodium as a result of pump work. The pump 228 is capable of developing a liquid sodium head of 130 p.s.i. to counteract the total pressure drop through the reactor vessel 12 of 107 p.s.i. and the pressure drop through the piping and heat exchanger 226 of 23 p.s.i. The reactor system including the vessel 12 and the primary loop 260 is pressurized to a minimum pressure of about 30 p.s.i.g. at the pump inlet to prevent vapor binding in the pump 228.

As pointed out previously that proportion of the total coolant flow passing through the core structure 14 is approximately 90%, so that 3,670,000 lbs. per hour or 8,800 gallons per minute of liquid sodium flows through the core structure 14. This produces an average operating sodium velocity of 10 feet per second, when the normal amount of fuel pellets 160 are present in the core or 4 feet per second for an empty core structure. In this example, the fuel spheres or pellets are about 0.36 inch in diameter with the result that 471,000 pellets are required to fill the active core area 100. This number of pellets comprises a total weight of 3,810 lbs. of $UO_2$ and 370 lbs. of stainless steel cladding having a thickness of about 7 mils.

The fuel pellets 160 are enriched to approximately 30% of $U^{235}$ or a total weight of 990 lbs. (450 kg.) thereof. If a lesser amount of excess reactivity is desired, the pellets 160 need be enriched a lesser amount without changing the given dimensions of the exemplary reactor system. Since pellets can be added and withdrawn readily, as described previously in connection with FIG. 5, the amount of excess reactivity is not extremely important to the total lifetime of the core.

The total fuel heat transfer area based upon the outer diameter of the cladding of the pellets 160 is 1,330 square feet with the result that the average heat flux is 446,000 B.t.u. per hour per square foot. The nominal peak-heat flux, however, will be as high as 892,000 B.t.u. per hour per square foot. Under these conditions the maximum temperature at the center of the fuel pellets 160 is 3000° F. while the maximum surface temperature thereof is 1500° F., with the result that a sodium heat transfer film coefficient of 5,000 B.t.u. per hour per square foot per ° F. is obtained.

The total volume of the active core region 100 is 11.04 cubic feet with the fuel pellets 150 filling 6.63 cubic feet of this volume in their packed condition. As a result the total sodium volume in the core area 100 is 4.41 cubic feet. Under these conditions the temperature rise of the liquid sodium coolant is about 495° F. resulting in the aforementioned outlet temperature of 1150° The maximum sodium temperature, however, is limited to about 1620° F., which is about the maximum safe operating temperature of the aforementioned austenitic stainless steels. Accordingly, the core coolant temperature rise can be even greater than 495° F. in the event it is desired to at least partially fluidize the pellets 160 by reducing the liquid sodium velocity through the core structure 14 for purposes of control.

Although a pellet diameter of 0.36 inch is employed, it was noted heretofore that the diameter of the pellets can vary between about ⅛ and ½ inch depending upon the allowable cost of manufacture and the heat transfer surface requirements. As pointed out previously, however, ½ inch pellets can be fluidized, if desired, with a liquid sodium coolant velocity of about 6 feet per second.

The fertile or blanket area 16 is filled with about 100 tons of pellets 54. In this example, the pellets 54 are maintained in packed relation under the influence of gravity since the 900 gallons per minute of liquid sodium, distributed throughout the blanket area 16, is insufficient to fluidize or move the pellets 54 upwardly in the blanket region 16. The pellets 54 not only serve as a biological shield surrounding the active core area 100, but in addition by capture of fast neutrons the natural uranium contained in the pellets 54 as $UO_2$ is transmuted into the fissionable isotope $Pu^{239}$ and other plutonium isotopes $Pu^{240}$ and $Pu^{241}$.

During the fast fission reaction, each atom undergoing fission yields approximately two fission fragments and an average of 2.46($U^{235}$), 2.54($U^{233}$), or 2.88($Pu^{239}$) fast neutrons. Approximately one neutron per fission obviously is required to sustain the chain reaction, whereas the remaining fast neutrons are available for converting fertile material into fissionable material as explained previously. Since fast neutrons are largely non-absorbed in the structural materials of the reactor, the reactor is capable of generating more fissionable isotope than is consumed in its chain reaction. Accordingly conversion ratios in the neighborhood of 1.2 are attainable.

In the event that the single large heat exchanger 226 or pump 228 is not desired, duplicate coolant loops, similar to loop 260 and each comprising a smaller heat exchanger (not shown) and a smaller pump (not shown), can be coupled between the outlet plenum member 22 and the outlet pump conduit 232. It should be pointed out that there is less mass transport in 1000° F. sodium than in 500° F. water; therefore, the relatively higher pressure drop across the fast reactor core of the invention can be tolerated. Inasmuch as the fuel and blanket pellets in the example described are maintained during operation in a packed relation, the pellets are subjected to very little erosion due to the lack of relative movement therebetween. Accordingly, the stainless steel cladding need only be thick enough to provide the necessary integrity to confine the fissional products within the individual pellets, and thus the thickness of the cladding can be reduced to as little as 4 to 5 mils, if desired.

From the foregoing it will be apparent that a novel and efficient reactor system has been disclosed herein. The reactor plant can be refueled and its fuel reprocessed, if desired, on a continuous basis without shutting down the the rector; as a result the plant load factor is improved. Considering that the reactor can be refueled on a continuous basis, little exces reactivity is required to prolong the core life time; accordingly the number of control rods usually employed in a reactor can be drastically reduced. Moreover, the minimal requirement of excess reactivity permits the reactor disclosed herein to be operated on its own bred fuel without intermediate reprocessing. The reactor plant is inherently safe inasmuch as the reactor can be shut down or scrammed quickly and easily simply by shutting off the valve 234 (FIG. 5). Upon loss of coolant flow for any reason the fission reaction is automatically terminated inasmuch as the pellets 160, which are supported by the upward flow of coolant, then fall and are separated into a positively non-critical pattern.

Numerous embodiments of the present invention will occur to those skilled in the art without departing from the spirit and scope thereof. It is to be understood moreover, that certain features of the invention can be employed without a corresponding use of other features.

I claim as my invention:

1. In a fast neutronic reactor, the combination comprising a core structure positioned generally within said reactor, a quantity of discrete fuel pellets contained loosely within said core structure in a dispersed non-critical array, physically spaced means for holding said fuel pellets in said dispersed non-critical array, and means for moving said fuel pellets from said dispersed non-critical array in said physically spaced means into a relatively closely spaced array within said core structure including means for circulating a non-moderating coolant fluid through said core structure with such force that said coolant flowing through said core structure gathers said pellets into said relatively closely spaced array, the number of said pellets being sufficient to sustain a fast fission chain reaction when in said relatively closely spaced array.

2. In a fast neutronic reactor, the combination comprising a generally tubular core container, said core container having an active region and an inactive region, a quantity of discrete nuclear fuel pellets contained within said inactive region in a dispersed non-critical array, and means communicating with said inactive region for moving said dispersed fuel pellets from said inactive region into a relatively closely spaced array within said active region by circulating a substantially non-moderating coolant through said core container with such force that said flowing coolant moves said pellets from said inactive region to said active region, the number of said pellets being sufficient to sustain a fast fission reaction when in said relatively closely spaced array.

3. In a fast neutronic reactor, the combination comprising a generally tubular core container, said core container having an active region and an inactive region, a quantity of discrete nuclear fuel pellets contained within said inactive region in a dispersed non-critical array, means communicating with said inactive region for moving said dispersed fuel pellets from said inactive region into a relatively closely spaced array within said active region by circulating a liquid metal through said core container with such force that said flowing liquid metal moves said pellets from said inactive region to said active region, the number of said pellets being sufficient to sustain a fast fission reaction when in said relatively closely spaced array, and means disposed in said active and inactive regions for retaining said pellets within said regions and for permitting liquid metal flow therethrough.

4. In a fast neutronic reactor, the combination comprising a generally tubular upright core structure disposed within said reactor, said core structure including an active area and at least two separate non-critical areas communicating with said active area, said non-critical areas being disposed generally below said active area, a quantity of discrete fuel pellets containable within said non-critical areas collectively in a dispersed array, and means for circulating a coolant fluid through said non-critical areas and said active areas so that said pellets are gathered from said non-critical areas and conveyed upwardly into a relatively closely spaced array within said active area, the quantity of said pellets being sufficient to sustain a fast fission chain reaction when in said array.

5. In a fast neutronic reactor, the combination comprising a generally tubular upright core structure disposed within said reactor, said core structure including an active area and at least two separated non-critical areas communicating with said active area, said non-critical areas being disposed generally below said active areas, a quantity of discrete fuel pellets containable within said non-critical areas collectively in a dispersed array, and means for circulating a coolant fluid through said non-critical areas and said active areas so that said pellets are gathered from said non-critical areas and conveyed upwardly into a relatively closed spaced array within said active area, the quantity of said pellets being sufficient to sustain a fast fission chain reaction when in said array, said non-critical areas being disposed generally below said active area so that upon loss of said coolant flow said pellets fall from said critical array under influence of gravity into said non-critical areas to terminate said chain reaction.

6. In a fast neutronic reactor, the combination comprising a generally tubular core structure disposed within said reactor, a quantity of discrete nuclear fuel pellets containable within said core structure, means for dividing said core structure into a plurality of discrete areas, at least one of said areas being capable of containing substantially all of said pellets in a packed critical array and the remainder of said areas being capable of containing substantially all of said pellets in a dispersed non-critical array generally below said critical array, and coolant means for moving said pellets generally upwardly from said dispersed non-critical array to said packed critical array within said core structure.

7. In a fast neutronic reactor, the combination comprising a generally tubular upright core structure disposed within said reactor, said core structure including an active area and at least two separated non-critical areas communicating with said active area, said non-critical areas being disposed generally below said active areas, a quantity of discrete fuel pellets containable with said non-critical areas collectively in a dispersed array, means for circulating a coolant fluid through said non-critical areas and said active areas so that said pellets are gathered from said sub-critical areas and conveyed upwardly into a relatively closely spaced array within said active area, the quantity of said pellets being sufficient to sustain a fast fission chain reaction when in said array, and means for withdrawing fuel pellets from said active area and for adding fuel pellets to each of said non-critical areas.

8. In a fast neutronic reactor, the combination comprising a reactor vessel, a generally tubular core container disposed generally within said reactor vessel, a quantity of discrete nuclear fuel pellets contained within said core container, means for dividing said core container into a plurality of discrete regions, at least one of said regions being capable of containing substantially all of said pellets in a packed critical array and the remainder of said regions being capable of containing substantially all of said pellets in a dispersed non-critical array, and means including a coolant for moving said pellets from said dispersed non-critical array to said packed critical array within said core container.

9. In a fast neutronic reactor, the combination comprising a reactor vessel, a core structure disposed spacedly within said vessel, a quantity of nuclear fuel pellets containable within said core structure in a relatively separated non-critical relationship, means for moving said fuel pellets from said non-critical relationship into a relatively closely spaced array including means for circulating a coolant fluid through said core structure so that the force of fluid flowing through the core structure gathers said pellets into said relatively closely spaced array, the number of said fuel pellets being sufficient to sustain a fast fission chain reaction when in said relatively closely spaced array, a quantity of discrete fertile pellets substantially filling the space between said core structure and said reactor vessel and substantially surrounding said array, a perforated pellet retaining member mounted in said core structure for retaining said fuel pellets in said array, an annular perforated member positioned between said core structure and said reactor vessel for retaining said fertile pellets in said space, means for circulating a coolant fluid through said space, plenum means communicating with said first and second mentioned perforated members for combining the coolant fluids passing through said core structure and through said fertile space, and means coupled to said plenum for conveying said coolant to an external load device.

10. In a fast neutronic reactor, the combination comprising a reactor vessel, a core container disposed spacedly within said vessel, a quantity of nuclear fuel pellets containable within said core container, means for holding said fuel pellets in a relatively separated non-critical relationship, means for moving said fuel pellets from said non-critical relationship into a relatively closely spaced array including means for circulating a coolant fluid generally upwardly through said core container with such force that said fluid flowing through said core container gathers said pellets into said relatively closely spaced array, the number of said fuel pellets being sufficient to sustain a fast fission chain reaction when in said relatively closely spaced array, a quantity of discrete fertile pellets substantially filling the space between said core container and said reactor vessel and substantially surrounding said array, a first pellet storage means, conduit means for transferring fuel pellets between said first pellet storage means and said core container, a second pellet storage means, and conduit means for transferring fertile pellets between said second storage means and said fertile space.

11. In a fast neutronic reactor, the combination comprising a reactor vessel, a core container disposed spacedly within said vessel, a quantity of nuclear fuel pellets containable within said core container, means for holding said fuel pellets in a relatively separated non-critical relationship, means for moving said fuel pellets from said non-critical relationship into a relatively closely spaced array including means for circulating a coolant fluid through said core container with such force that said fluid flowing through said core container gathers said pellets into said relatively closely spaced array, the number of said fuel pellets being sufficient to sustain a fast fission chain reaction when in said array, a quantity of discrete fertile pellets substantially filling the space between said core container and said reactor vessel and substantially surrounding said array, a first pellet storage means, conduit means for transferring fuel pellets between said first pellet storage means and said core container, a second pellet storage means, conduit means for transferring fertile pellets between said second storage means and said fertile space, and additional conduit means for transferring fertile pellets from said fertile space to said first pellet storage means so that said fertile pellets after a period of irradiation within said reactor can be transferred to said container as fuel pellets therefor.

12. In a fast neutronic reactor, the combination comprising a generally tubular core structure disposed within said reactor, said core structure having an active area and an inactive area, a quantity of discrete nuclear fuel pellets containable within said inactive area in a dispersed array, means for moving said dispersed fuel pellets from said inactive area into a relatively closely spaced array within said active area including means for circulating a coolant fluid through said core structure so that the force of flowing coolant moves said pellets from said inactive area to said active area, the number of said pellets being sufficient to sustain a fast fission reaction when in said array, means disposed adjacent said active area for retaining said pellets within said active area and for permitting coolant flow therethrough, at least one control member shroud tube inserted into said reactor and extending substantially through said array, said shroud tube being inserted through said retaining member and being supported thereby, an elongated control member inserted into said shroud tube and mounted for longitudinal movement therein relative to said core structure, means for moving said control member, and means for adding and withdrawing fuel pellets relative to said core structure, said means including a pellet outlet conduit inserted into said reactor the inner end of which is inserted through and supported by said retaining means to communicate with said array.

13. A fast neutronic reactor comprising a generally cylindrical container, a coolant outlet conduit coupled to said container, a plurality of coolant inlet conduits coupled to said container and spacedly disposed from each other, said outlet conduit being disposed generally above said container and said inlet conduits being disposed generally below said container, a quantity of nuclear fuel material dispersed by and contained within said inlet conduits in a non-critical array, coolant circulating means coupled to said inlet conduits for circulating a coolant through said inlet conduits and said container and for conveying said fuel material from said inlet conduits to said container, and perforated means disposed in said container for retaining said material within said container against the flow of said coolant in a relatively closely spaced array so that said material is capable of sustaining a nuclear chain reaction within said container.

14. In a fast neutronic reactor, the combination comprising a generally cylindrical container supported within said reactor, a coolant outlet conduit coupled to said container, a plurality of coolant inlet conduits coupled to said container, said outlet conduit being disposed generally above said container and said inlet conduit disposed generally below said container, a quantity of nuclear fuel material containable loosely within said inlet conduits, pumping means coupled to said inlet conduits for circulating a coolant fluid through said inlet conduits and said container so that said fuel material is conveyed from said inlet conduits to said container, means for retaining said material within said container against the flow of said coolant in a relatively closely spaced array so that said material is capable of sustaining a fast fission chain reaction, and separating baffle means disposed generally below said container and communicating with said inlet conduits so that upon loss of coolant flow said fuel material falls by force of gravity and is separated and distributed by said baffle for containment as non-critical portions within said inlet conduits respectively.

15. In a fast neutronic reactor, the combination comprising a generally tubular upright core structure disposed within said reactor, said core structure including an active area and at least two separated non-critical areas communicating with said active area, said non-critical areas being disposed generally below said active area, a quantity of discrete fuel pellets containable within said non-critical areas collectively in a dispersed array, means for circulating a coolant fluid through said non-critical areas and said active area so that said pellets are gathered from said non-critical areas and conveyed upwardly into a relatively closely spaced array within said active area, the quantity of said pellets being sufficient to sustain a fast fission chain reaction when in said array, said non-critical areas being disposed generally below said active area so that upon loss of said coolant flow said pellets fall from said critical array under influence of gravity into said non-critical areas to terminate said chain reaction, and means for dividing said falling pellets into substantially equal portions corresponding in number to that of said non-critical areas and for distributing said pellet portions to said non-critical areas respectively.

16. A method of producing a fast fission reaction in a quantity of discrete fissile material said method comprising placing a quantity of said discrete fissile material in a relatively dispersed array, moving said fissile material generally upwardly from said dispersed array into a packed array above said dispersed array with a substantially non-moderating fluid, holding said fissile material in said packed array so as to sustain a fast fission reaction, and permitting said material to fall under the influence of gravity into said dispersed array to terminate said reaction by a reduction in the fluid flow.

17. A method of producing a fast fission reaction in a quantity of discrete fissile material said method comprising placing a quantity of said discrete fissile material in a relatively dispersed array, fluidizing said fissile material generally upwardly from said dispersed array into a packed array above said dispersed array by a sufficient flow of a fluid, holding said fissile material in said packed array so as to sustain a fast fission reaction, and permitting said material to fall by gravity into approximately equally dispersed portions to terminate said reaction by a reduction in the fluid flow.

18. A method of producing a fast fission reaction comprising the steps of providing a plurality of separated zones of discrete pellets at least some of which include fissionable fuel material, said zones maintaining said pellets in a non critical array, passing a gradually increasing flow of a non-moderating coolant through said discrete pellets to cause the pellets to move into a packed critical array by said coolant until the amount of fissionable fuel material packed together is sufficiently high to produce said fast fission reaction, and continuing such flow during the fast fission reaction.

19. The combination of claim 3 including a quantity of fertile pellets contained within the space between said core container and said reactor vessel, and means for circulating a coolant through said space with sufficient force to fluidize said fertile pellets so that the fluidized array of fertile pellets substantially fills said space and substantially surrounds said array of fuel pellets.

(References on following page)

References Cited by the Examiner

UNITED STATES PATENTS

| | | | |
|---|---|---|---|
| 2,870,076 | 1/1959 | Koch | 176—17 |
| 2,961,393 | 11/1960 | Monson | 176—18 |
| 2,975,116 | 3/1961 | Daniels | 176—18 |
| 2,975,117 | 3/1961 | Zinn | 176—18 |
| 3,039,945 | 6/1962 | Slack et al. | 176—45 X |
| 3,046,212 | 7/1962 | Anderson | 176—45 |
| 3,058,897 | 10/1962 | Slack et al. | 176—45 |
| 3,092,562 | 6/1963 | Vanderschee | 176—47 |
| 3,105,025 | 9/1963 | Hosegood et al. | 176—38 |

FOREIGN PATENTS 756,014  8/1956  Great Britain.

OTHER REFERENCES

April 1957, Nucleonics, pages 62–72.
Nuclear Science and Engineering 2 (1957), 501–512.

REUBEN EPSTEIN, *Primary Examiner.*